United States Patent
Peng et al.

(10) Patent No.: US 11,409,016 B2
(45) Date of Patent: Aug. 9, 2022

(54) CORRELATING STRATA SURFACES ACROSS WELL LOGS

(71) Applicant: LANDMARK GRAPHICS CORPORATION, Houston, TX (US)

(72) Inventors: Yang Peng, Austin, TX (US); Ahinoam Pollack, Stanford, CA (US); Kainan Wang, Houston, TX (US); Ming-Kang Shih, Houston, TX (US); Krisha Hansel Tracy, Cypress, TX (US); Jesse Mathias Lomask, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 529 days.

(21) Appl. No.: 16/479,882

(22) PCT Filed: Mar. 8, 2017

(86) PCT No.: PCT/US2017/021361
§ 371 (c)(1),
(2) Date: Jul. 22, 2019

(87) PCT Pub. No.: WO2018/164680
PCT Pub. Date: Sep. 13, 2018

(65) Prior Publication Data
US 2021/0405238 A1    Dec. 30, 2021

(51) Int. Cl.
| | |
|---|---|
| *G01V 1/48* | (2006.01) |
| *E21B 47/26* | (2012.01) |
| *E21B 49/00* | (2006.01) |
| *G01V 1/34* | (2006.01) |
| *G01V 1/28* | (2006.01) |
| *G01V 1/30* | (2006.01) |

(52) U.S. Cl.
CPC ............. *G01V 1/48* (2013.01); *E21B 47/26* (2020.05); *E21B 49/003* (2013.01); *G01V 1/28* (2013.01); *G01V 1/301* (2013.01); *G01V 1/34* (2013.01)

(58) Field of Classification Search
USPC .......................................................... 367/25
See application file for complete search history.

(56) References Cited

U.S. PATENT DOCUMENTS

| | | |
|---|---|---|
| 7,280,932 B2 | 10/2007 | Zoraster et al. |
| 2006/0052937 A1 | 3/2006 | Zoraster et al. |
| | (Continued) | |

FOREIGN PATENT DOCUMENTS

| | | |
|---|---|---|
| WO | 2010002601 A2 | 1/2010 |
| WO | 2016011384 A1 | 1/2016 |
| WO | 2017135972 | 8/2017 |

OTHER PUBLICATIONS

U.S. Appl. No. 16/479,900, Final Office Action, dated Jun. 14, 2021, 13 pages.

(Continued)

*Primary Examiner* — Paul D Lee
(74) *Attorney, Agent, or Firm* — Kilpatrick Townsend & Stockton LLP

(57) ABSTRACT

Strata surfaces can be identified in well logs and correlated across the well logs taking into account manual corrections. For example, a computing device can receive well logs. The computing device can determine multiple stratum-surface correlations based on the well logs. Then, the computing device can receive user input indicating a correction to a particular stratum-surface correlation. Based on the correction to the particular stratum-surface correlation, the computing device can update some or all of the other stratum-surface correlations.

20 Claims, 14 Drawing Sheets

(56) References Cited

U.S. PATENT DOCUMENTS

| | | | |
|---|---|---|---|
| 2010/0307742 A1 | 12/2010 | Phillips et al. | |
| 2014/0081613 A1 | 3/2014 | Dommisse et al. | |
| 2014/0100833 A1 | 4/2014 | Williams et al. | |
| 2014/0316706 A1 | 10/2014 | Grant et al. | |
| 2015/0088424 A1 | 3/2015 | Burlakov et al. | |
| 2015/0120195 A1 | 4/2015 | Dong et al. | |
| 2015/0134255 A1* | 5/2015 | Zhang | G01V 99/005 702/14 |
| 2015/0300150 A1 | 10/2015 | Burkay | |
| 2015/0377003 A1 | 12/2015 | Benson et al. | |
| 2016/0124116 A1* | 5/2016 | Souche | G01V 99/005 703/2 |
| 2016/0334542 A1 | 11/2016 | Chiu et al. | |

OTHER PUBLICATIONS

U.S. Appl. No. 16/479,900, Non-Final Office Action, dated Feb. 11, 2021, 13 pages.

U.S. Appl. No. 16/479,900, Notice of Allowance, dated Aug. 30, 2021, 21 pages.

GB Application No. GB1910860.4, "First Examination Report", dated Sep. 16, 2021, 4 pages.

GB Application No. GB1911265.5, Office Action, dated Jul. 1, 2021, 2 pages.

FR1850816, "Office Action", dated Mar. 27, 2018, 2 pages.

GitHub, "Machine learning contest", https://github.com/seg/2016-ml-contest, Oct. 2016, 5 pages.

Hall, "No secret codes: announcing the winners", https://agilescientific.com/blog/2017/2/2/no-secret-codes, Feb. 2, 2017, 4 pages.

Mirowski, et al., "New Software for Well-to-Well Correlation of Spectroscopy Logs", Schlumberger, available to the public at least as early as Mar. 10, 2017, 3 pages.

PCT/US2017/021361, "International Search Report and Written Opinion", dated Dec. 8, 2017, 16 pages.

PCT/US2017/025405, "International Search Report and Written Opinion", dated Dec. 27, 2017, 20 pages.

Wheeler, "Automatic and Simultaneous Correlation of Multiple Well Logs", 2015, 48 pages.

Zhao, et al., "shapeDTW: shape Dynamic Time Warping", Jun. 6, 2016, 3 pages.

* cited by examiner

```
for (i > MaxShift, j = 0)
    AccE (i, 0) = ∞                      ──1002
for (i = 0, j > MaxShift)
    AccE (0, j) = ∞
```

```
for (i < MaxShift, j = 0)
{
    AccE (i, 0) = ErrM (i, 0)
    PathL (i, 0) = 1
    Direction(i, 0) = 0
}
for (i = 0, j < MaxShift)
{
    AccE (0, j) = ErrM (i, 0)
    PathL (i, 0) = 1
    Direction (i, 0) = 0
}
for i > 0, j > 0:
{
```

// The accumulated error at (i, j) if the path continues from the bottom left node of (i-1, j-1).

$$ErrBotLeft = \frac{AccE(i-1, j-1) * PathL(i-1, j-1) + ErrM(i, j)}{PathL(i-1, j-1) + 1}$$

// The accumulated error at (i, j) if the path continues from the left node of (i-1, j-2). Notice that the algorithm may be unable to proceed from the node directly to the left, since there is a stepping constraint that for every two steps in the horizontal/vertical direction, a step needs to be taken from the opposite direction.

$$ErrorLeft = \frac{AccE(i-1, j-2) * PathL(i-1, j-2) + min(ErrM(i-1, j-1), ErrM(i, j-1)) + ErrM(i, j)}{PathL(i-1, j-2) + 2}$$

// The accumulated error at (i, j) if the path continues from the bottom node of (i-2, j-1)

$$ErrBtm = \frac{AccE(i-2, j-1) * PathL(i-2, j-1) + min(ErrM(i-1, j-1), ErrM(i-1, j)) + ErrM(i, j)}{PathL(i-2, j-1) + 2}$$

```
AccE(i, j) = min(ErrBotLeft, ErrorLeft, ErBtm)
PathL(i, j) = {
    (PathL(i-1, j-1) + 1) if min → ErrBotLeft
    (PathL(i-1, j-2) + 2) if min → ErrorLeft
    (PathL(i-2, j-1) + 2) if min → ErrorBtm}
Dir(i, j) = {
    1 (if min → ErrorLeft)
    2 (if min → ErrorLeft)
    3 (if min → ErrorBottom)
}
```

FIG. 10

CORRELATING STRATA SURFACES ACROSS WELL LOGS

TECHNICAL FIELD

The present disclosure relates generally to methods and devices used with geological interpretation. More specifically, but not by way of limitation, this disclosure relates to correlating surfaces of strata across well logs.

BACKGROUND

A well system (e.g., for extracting oil or gas) can include multiple wellbores drilled through a subterranean formation. Each wellbore can have a well logging tool that provides data in the form of a well log back to a well operator. A well log can be a record indicative of the geologic formations that are penetrated by a wellbore. The well operator can manually review the well logs to identify strata or other features of interest in the subterranean formation. For example, the well operator can manually review multiple well logs in a two-dimensional (2D) cross-sectional view or a three-dimensional (3D) view to identify structures or features of interest.

BRIEF DESCRIPTION OF THE DRAWINGS

FIG. 10 is listing of an example of pseudo code for generating an accumulated-error matrix according to some aspects.

DETAILED DESCRIPTION

Certain aspects and features of the present disclosure relate to updating a group of stratum-surface correlations based on a manual correction to a particular stratum-surface correlation within the group. A stratum-surface correlation can be an association between nodes (e.g., data points) in well logs that correspond to the same surface of a particular stratum within a subterranean formation. For example, a computing device can receive multiple well logs. The computing device can analyze the well logs to determine a group of stratum-surface correlations. Thereafter, the computing device can receive user input indicating a manual correction to one of the stratum-surface correlations in the group. Based on the manual correction, the computing device can update some or all of the other stratum-surface correlations in the group. For example, based on a manual correction to a first stratum-surface correlation in the group, the computing device can update a second stratum-surface correlation in the group.

More specifically, strata in a subterranean formation are layered directly on top of one another, such that a top surface of one stratum forms a bottom surface of another stratum. This results in interdependency among the stratum surfaces, and thus the stratum-surface correlations. The computing device can account for this interdependency by recalculating the stratum-surface correlations in the group using the manual correction as a constraint. This can result in a more realistic and accurate determination of the stratum-surface correlations in the group.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
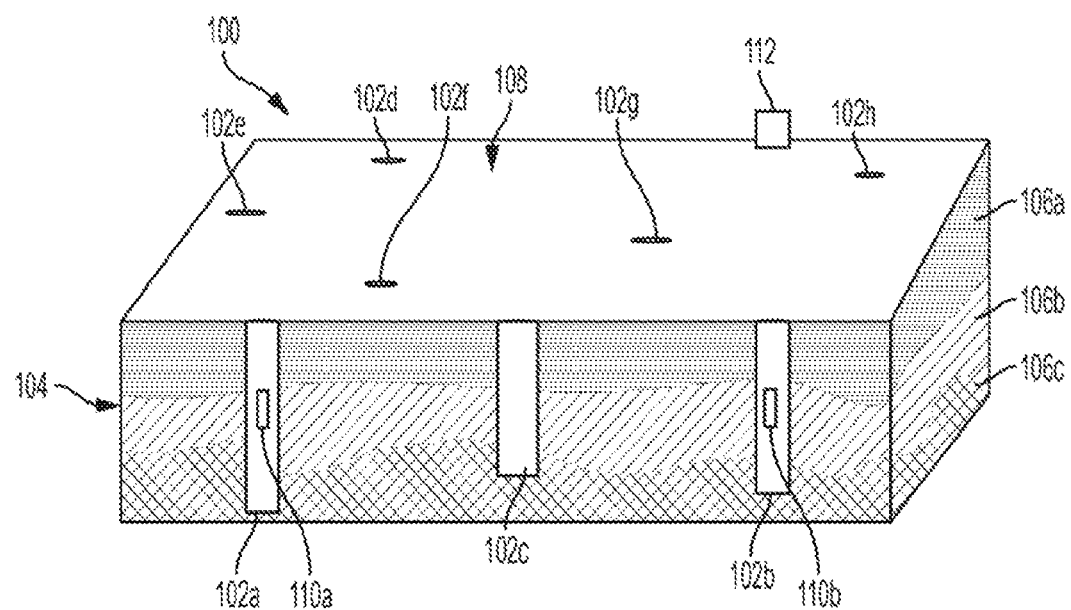
FIG. 1 is a cross-sectional side view of an example of a well system for obtaining well logs according to some aspects.

FIG. 1 is a cross-sectional side view of an example of a well system 100 for obtaining well logs according to some aspects. The well system 100 includes multiple wellbores 102a-h drilled through a subterranean formation 104. The wellbores 102a-h extend from the well surface 108 into strata 106a-c of the subterranean formation 104. The strata 106a-c can include different materials (e.g., rock, soil, oil, water, or gas) and vary in thickness and shape.

Some or all of the wellbores 102a-h can include well tools, such as logging tools 110a-b, for generating the well logs. Each of the well tools can measure properties of the rocks, fluid, or other contents of the strata 106a-c and use the measured properties to generate a respective well log. For example, the logging tool 110a can measure the electrical, acoustic, radioactive, electromagnetic, or pressure properties of the strata regions proximate to wellbore 102a. The logging tool 110a can then use the measurements to generate a well log. A separate well log can be generated for each of the wellbores 102a-h.

The well tools can electronically communicate the well logs to a computing device 112, which can be positioned onsite (as shown in FIG. 1) or offsite. The well tools can electrically communicate with the computing device 112 via a wired or wireless interface. In some examples, the well tools can electronically communicate the well logs to the computing device 112 indirectly, such as over the Internet or another network.

Figure 2:
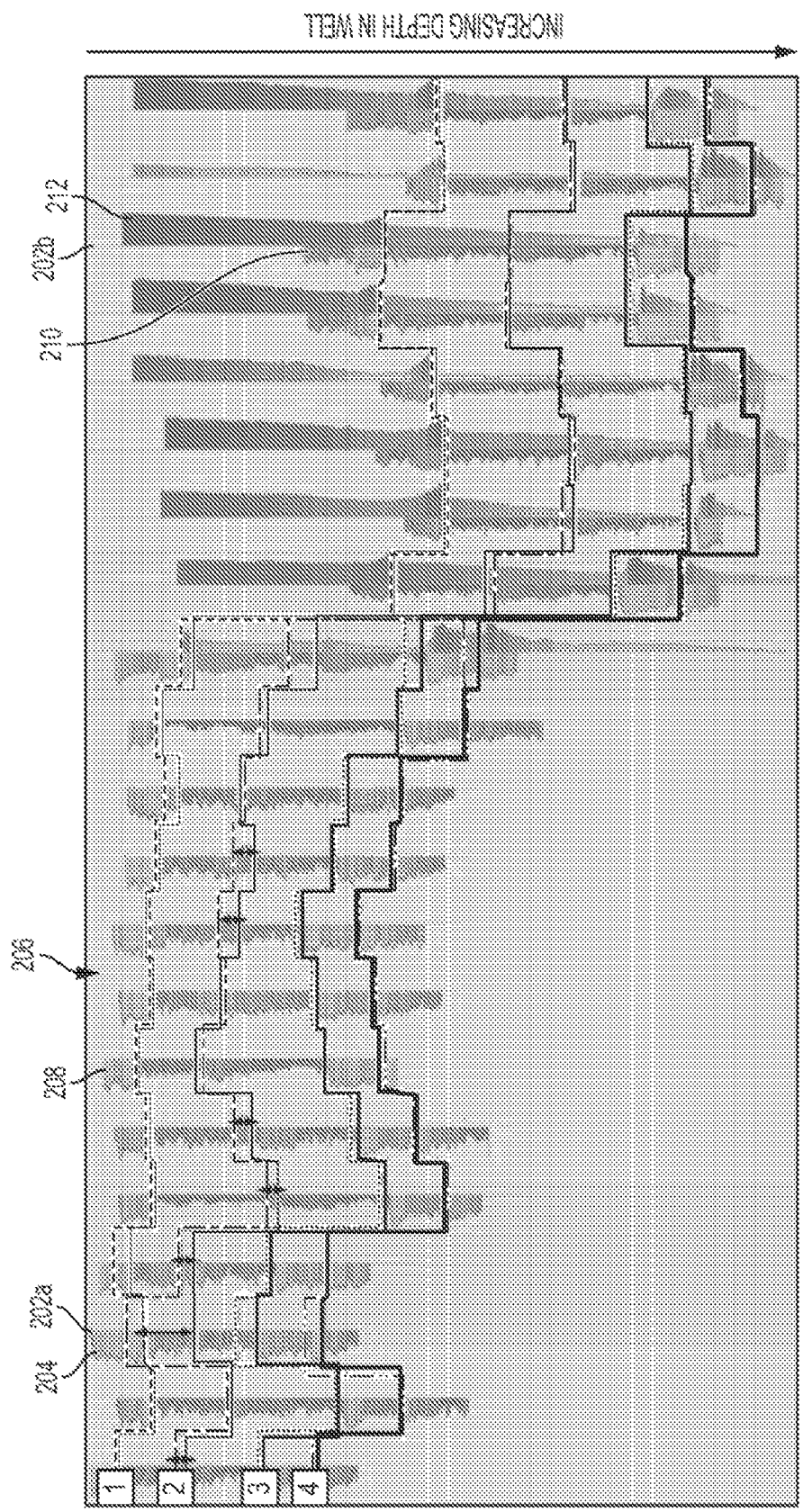
FIG. 2 is a graph of an example of strata surfaces that have been correlated among multiple well logs according to some aspects.

The computing device 112 can display some or all of the well logs as two-dimensional (2D) or three-dimensional (3D) figures. One example of such a figure is shown in FIG. 2. In FIG. 2, each vertical line represents a single wellbore. For example, vertical line 202a represents a particular wellbore. Because there are 21 vertical lines, there are 21 different wellbores represented in this figure. The portion of the line 202a near the top 206 of the figure represents the portion of the wellbore near the well surface, with the depth of the wellbore increasing down the page. The patterned data to the left of a vertical line is a well log. For example, patterned data 204 is a well log corresponding to the wellbore represented by line 202a. A peak, trough, or change in shading in the patterned data 204 can represent the changing composition of the strata in the subterranean formation.

In FIG. 2, the nine rightmost vertical lines have two corresponding well logs—one well log to the left and another well log to the right. For example, the vertical line 202b has one well log 210 to the left and another well log 212 to the right. These well logs are from the same wellbore (represented by vertical line 202b), but generated using different methods. For example, well log 210 may be generated based on gamma radiation emitted from the strata in the subterranean formation, and well log 212 may be generated based on the spontaneous potential of the strata in the subterranean formation. The computing device 112 can output any number and combination of well logs individually or concurrently.

In the example shown in FIG. 2, all of the well logs are from wellbores that are part of the same well system and penetrate the same strata. So, all of the well logs provide information about the same strata. But because the strata are nonuniform, the wellbores are in different locations within the well system, and the wellbores have different depths, the well logs do not all perfectly align with one another. For example, the grooves and troughs representing a particular stratum in well log 208 may be closer to the top 206 of FIG. 2 than the grooves and troughs representing the same stratum in well log 210. It may be desirable to identify and correlate a single stratum across multiple well logs.

Typically, a geologist can review the well logs and manually identify the same stratum in each well log. The geologist can then correlate the same stratum across the well logs. Examples of manually identified and correlated strata are shown as solid lines in FIG. 2. The first solid line (extending from box "1" on the left) can represent the upper surface of a first stratum. The second solid line (extending from box "2" on the left) can represent the upper surface of a second stratum. The third solid line (extending from box "3" on the left) can represent the upper surface of a third stratum. And the fourth solid line (extending from box "4" on the left) can represent the upper surface of a fourth stratum. But manually reviewing and correlating surfaces of strata among multiple well logs can be expensive, time consuming, challenging, and subjective. A geologist may spend several days identifying and correlating thousands surfaces across dozens of well logs.

In some examples, the computing device 112 can execute a software application to identify and correlate strata across multiple well logs. For example, the computing device 112 can use the software application to analyze each of the well logs, identify the various strata in the well logs, and correlate the strata to one another, all without manual intervention. Examples of strata surfaces correlated using a software application are shown as dashed lines in FIG. 2. The first dashed line (extending from box "1" on the left) can represent the upper surface of a first stratum. The second dashed line (extending from box "2" on the left) can represent the upper surface of a second stratum. The third dashed line (extending from box "3" on the left) can represent the upper surface of a third stratum. And the dashed solid line (extending from box "4" on the left) can represent the upper surface of a fourth stratum. Correlating strata using a software application can be faster, more consistent, require less processing time, and require less power usage than manual correlation.

Figure 3:
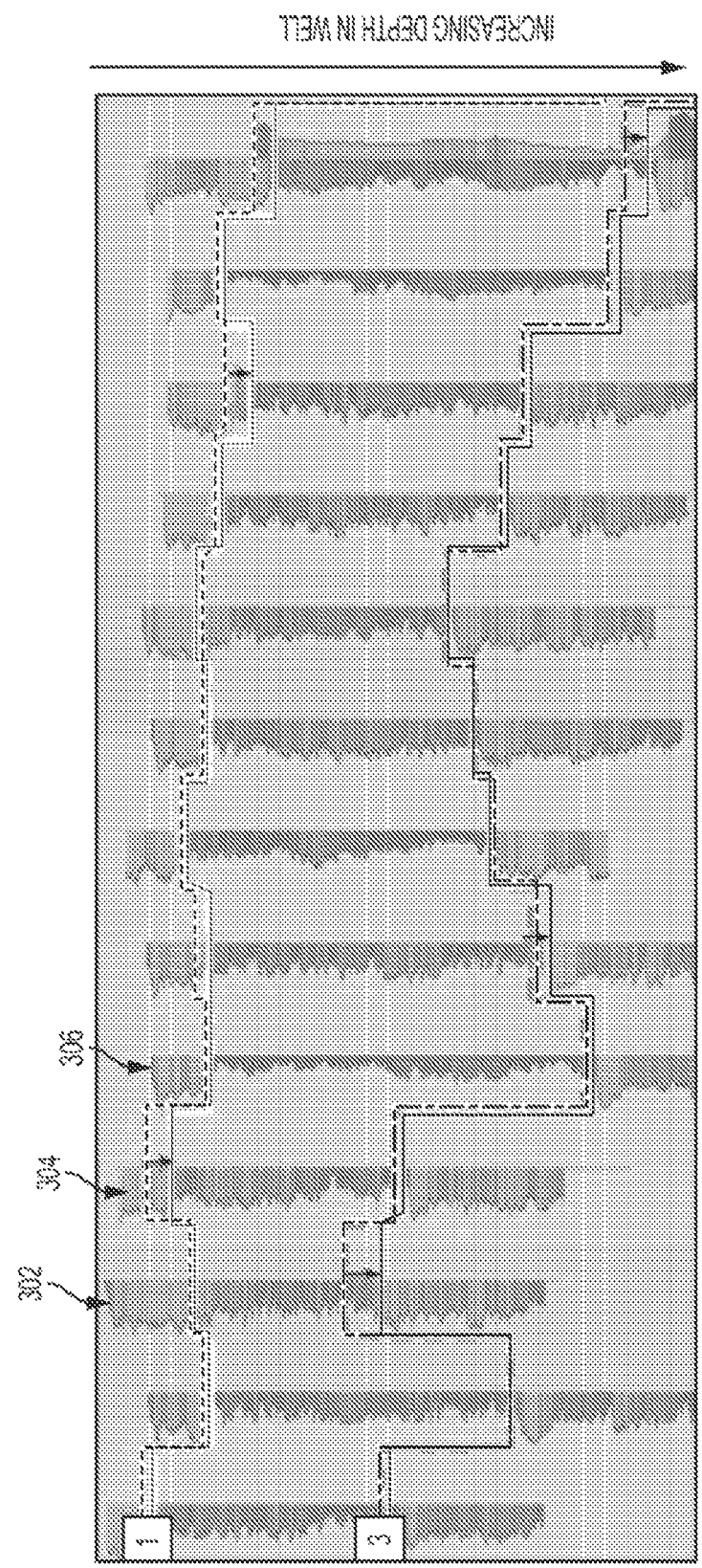
FIG. 3 is a graph of an example of corrections to two of the strata surfaces in FIG. 2 according to some aspects.

Software-based correlation, however, may not always provide identical results to manual correlation. For example, the dashed lines in FIG. 2 deviate from the solid lines in some locations. These deviations are represented by arrows. Some examples of the present disclosure enable a user to correct for these deviations or other errors in the strata surfaces correlated using a software application. For example, the computing device 112 can receive user input in which the user drags a portion of a surface of a stratum identified using a software application to a new location. An example of this dragging is represented by arrows in FIG. 3. In FIG. 3, the software-correlated surfaces of stratum 1 and stratum 3 (as shown by the dashed lines) are dragged in certain locations by the user to conform more closely to the manually correlated surfaces.

Figure 4:
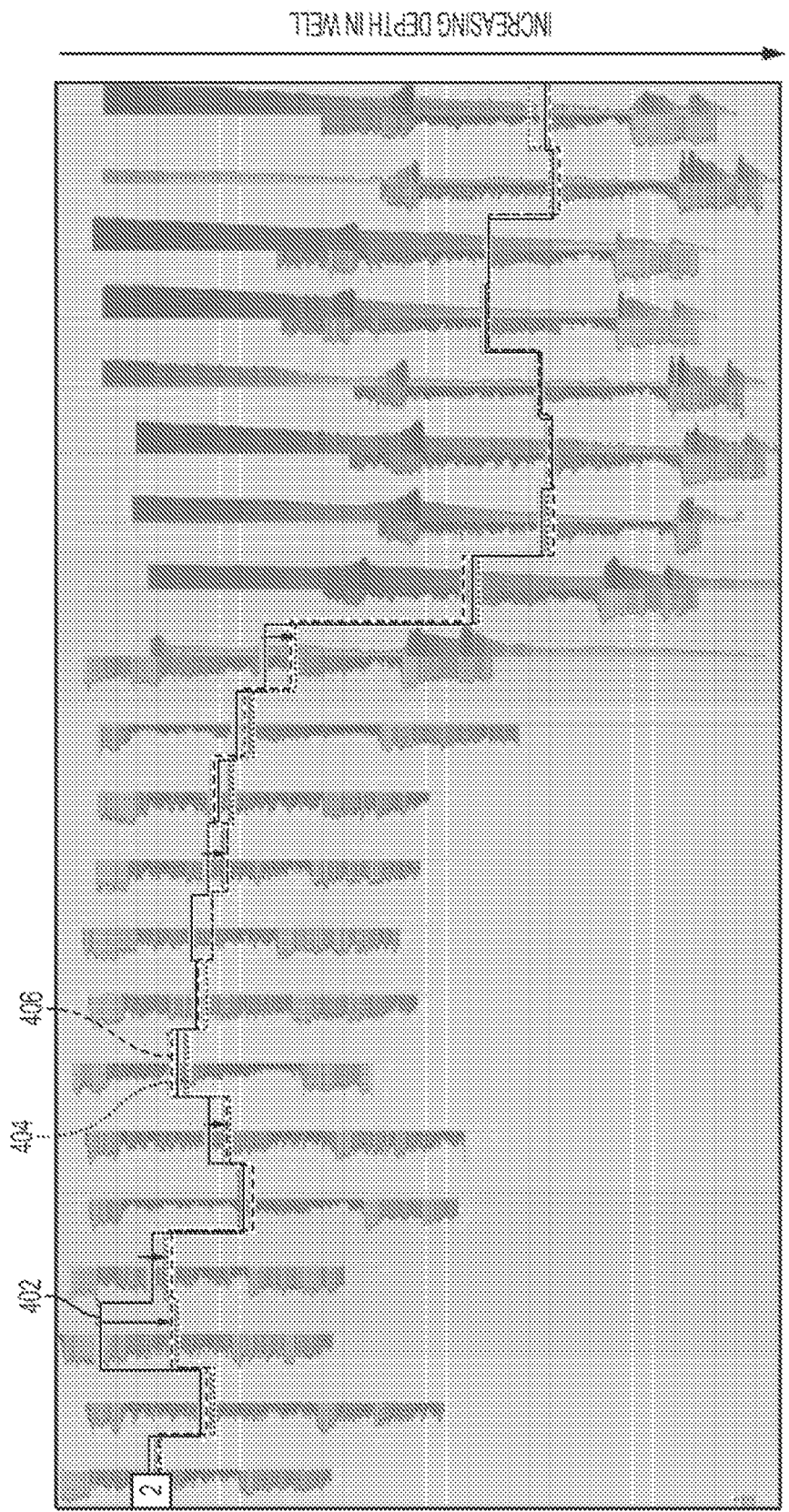
FIG. 4 is a graph of an example of an updated stratum surface resulting from the corrections shown in FIG. 3 according to some aspects.

In some examples, the computing device 112 can update one or more stratum surfaces taking into account the above-mentioned manual corrections. For example, the manual corrections to the surfaces of stratum 1 and stratum 3 can also affect a surface of stratum 2, because stratum 2 is positioned between stratum 1 and stratum 3. So, the computing device 112 can update a surface for stratum 2 using the manual corrections to stratum 1 and stratum 3 as constraints. An example of an updated surface for stratum 2 is shown in FIG. 4. In FIG. 4, line 402 is the original surface for stratum 2 identified and correlated by a software application. Line 406 is the manually identified surface for stratum 2. And line 404 is the updated surface for stratum 2, which was generated by the software application and taking into account the manual corrections to stratum 1 and stratum 3. Because the updated surface is closer to the manually identified surface, the updated surface may be more accurate.

Figure 5:
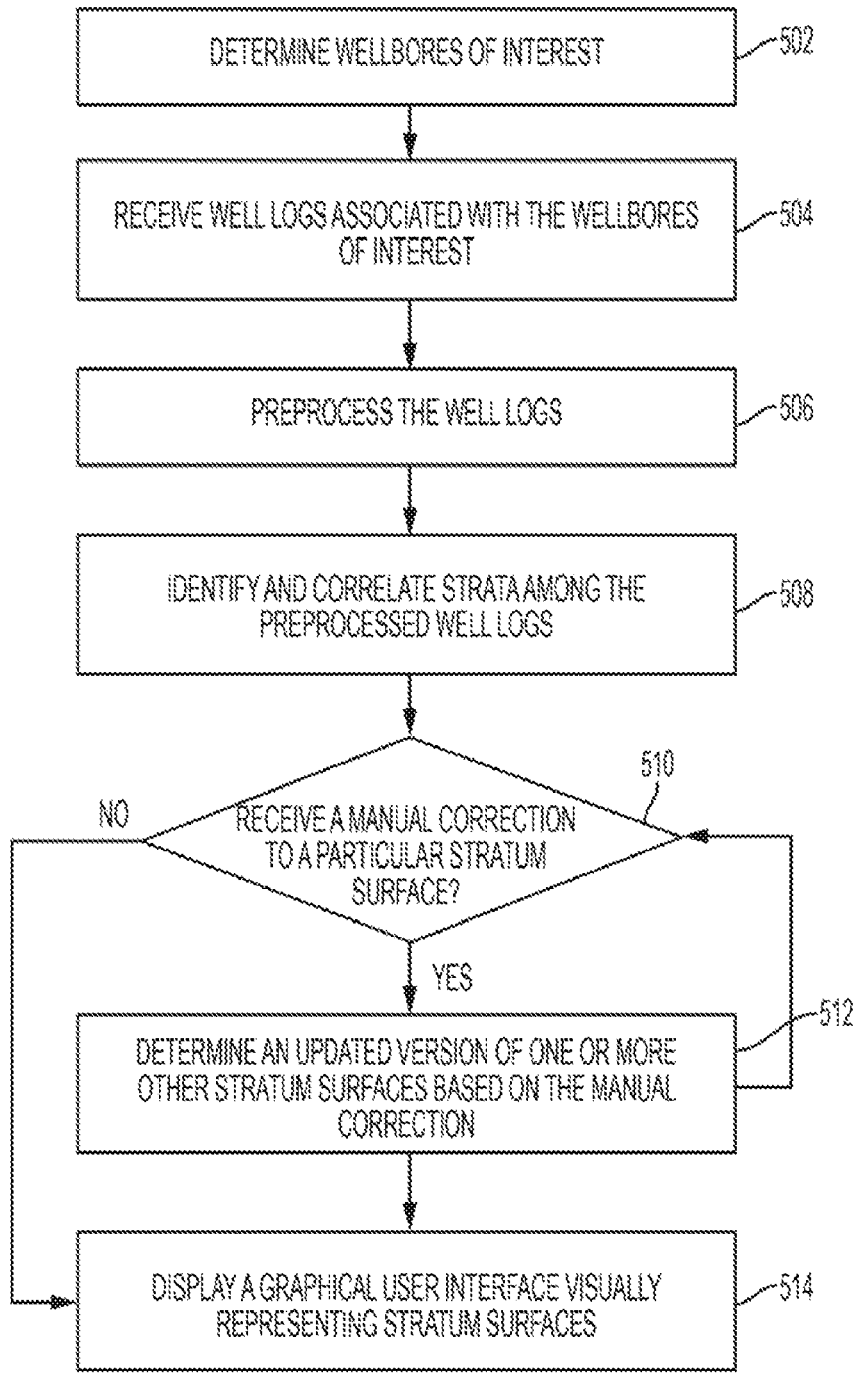
FIG. 5 is a flow chart of an example of a process for correlating strata surfaces across well logs according to some aspects.

In some examples, the computing device 112 can implement some or all of the abovementioned features using the process shown in FIG. 5. In other examples, the computing device 112 can implement a process that has more steps, fewer steps, different steps, or a different order of the steps depicted in FIG. 5.

Turning now to FIG. 5, in block 502, the computing device 112 determines wellbores of interest. The computing device 112 can determine the wellbores of interest based on user input indicating the wellbores of interest. For example, the computing device 112 may display graphical user interface (GUI) having a visual representation of multiple wellbores in a well system. The computing device 112 can receive, as user input, a selection of some or all of the wellbores displayed in the GUI. In some examples, the wellbores need not be selected or ordered according to a depositional dip line. The computing device 112 can receive the user input via a user input device. The computing device 112 can use the selected wellbores as the wellbores of interest.

In block 504, the computing device 112 receives well logs associated with the wellbores of interest. For example, the computing device 112 can retrieve the well logs from a local memory device. In another example, the computing device 112 can communicate with a remote server to retrieve the well logs from a remote database.

In block 506, the computing device 112 preprocesses well logs corresponding to the wellbores of interest. The computing device 112 can perform one or more operations to preprocess the well logs.

In some examples, the computing device 112 can preprocess the well logs by normalizing the well logs so that the well logs can be compared to one another. For example, all of the well logs may not have a uniform range of values. To make the well logs comparable, the computing device 112 can manipulate the well logs so that all of the well logs have the same range of values. As a particular example, a spontaneous-potential well log often does not have a standard range of values. So, to compare two spontaneous-potential well logs, the computing device 112 can normalize the two well logs so they both have the same range of values.

In some examples, the computing device 112 can preprocess the well logs by smoothing the well logs. For example, well logs can have high-frequency noise. The computing device 112 can smooth the well logs to reduce or eliminate the influence of the high frequency noise. For example, the computing device 112 can divide the well log into intervals of a predetermined amount of nodes (e.g., intervals of five nodes). The computing device 112 can determine a mean value of the nodes in an interval and assign all the nodes in the interval the mean value. The computing device 112 can repeat this process for all the intervals, thereby smoothing the well log. This can help reduce the influence of high-frequency noise in the well-log correlation process.

In some examples, the computing device 112 can preprocess the well logs by removing a trend from the well logs. A trend can include an increase or decrease in the values of a well log with depth. A trend may occur due to malfunctioning of the well tool that generated the well log or some other non-geological phenomenon. The computing device 112 can remove a trend from a well log to reduce errors associated with the trend.

In some examples, the computing device 112 may not preprocess the well logs. Rather, the computing device 112 may use the well logs in their raw form to perform some or all of the remaining steps described below.

In block 508, the computing device 112 identifies and correlates strata among the preprocessed well logs. For example, the computing device 112 can execute a software application that automatically (e.g., without manual intervention) identifies strata in the well logs and correlates the strata across the well logs.

In block 510, the computing device 112 determines if a manual correction to a particular stratum surface has been received. The manual correction can be provided by a user.

In some examples, the computing device 112 can receive user input indicating the manual correction. For example, the computing device 112 can receive text input designating a new location for a stratum surface and indicating that the originally identified location was incorrect. This can be the manual correction. As another example, the computing device 112 can display a GUI line indicating a location of a stratum surface. The computing device 112 can detect a user dragging the GUI line to a new location, thereby indicating that the original location of the stratum surface was incorrect. This can be the manual correction.

If the computing device 112 determines that a manual correction to a stratum surface has been received, the process can continue to block 512. Otherwise, the process can continue to block 514. In block 514, the computing device 112 displays a GUI, such as the GUI shown in FIGS. 2-4, visually representing the stratum surfaces.

In block 512, the computing device 112 determines an updated version of one or more other stratum surfaces based on the manual correction. For example, the computing device 112 can determine an updated version of a single stratum surface or updated versions of multiple stratum surfaces based on the manual correction. In some examples, the computing device can re-determine all of the stratum surfaces based on the manual correction. This may result in some stratum surfaces remaining the same and other stratum surfaces being modified.

Figure 6:
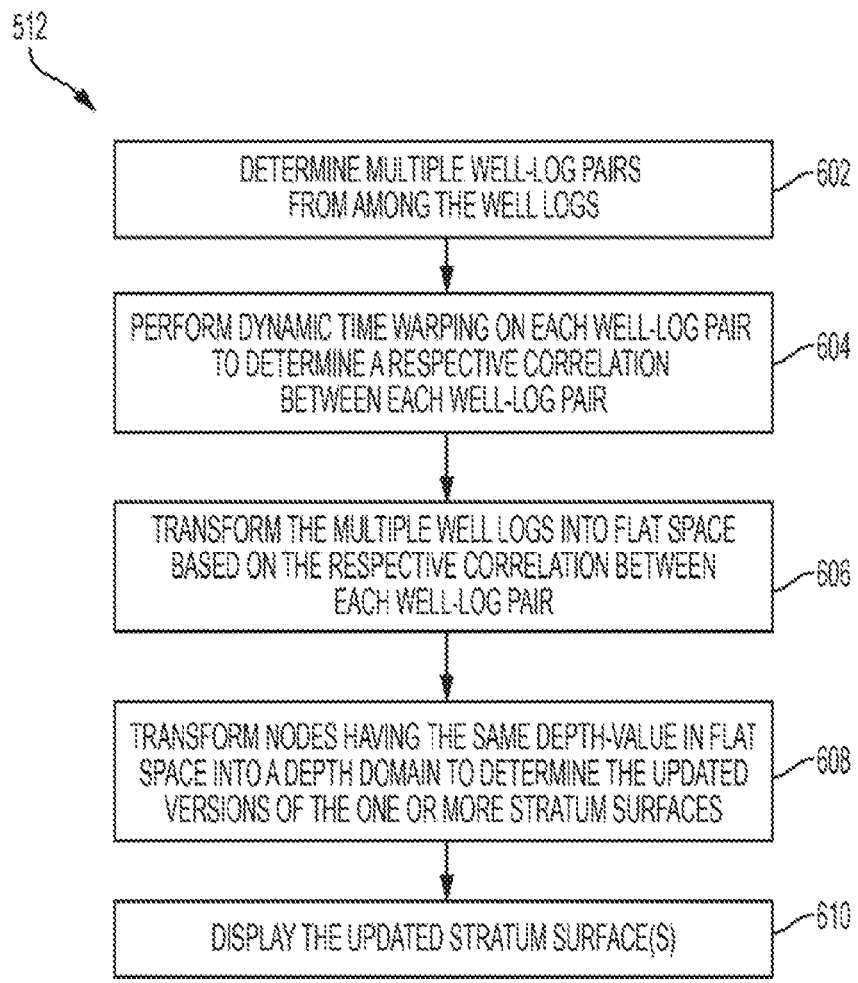
FIG. 6 is a flow chart of an example of a process for determining an updated version of a stratum surface based on a correction according to some aspects.

In some examples, the computing device 112 can determine the updated version of the other stratum surface(s) using the process shown in FIG. 6. In other examples, the computing device 112 can implement a process that has more steps, fewer steps, different steps, or a different order of the steps depicted in FIG. 6.

In block 602, the computing device 112 determines multiple well-log pairs from among the well logs (e.g., received in block 504). In some examples, the computing device 112 may determine all possible well-log pairs from among the well logs. For example, the computing device 112 can determine a total of $(n_{logs}*(n_{logs}-1))/2$ pairs of well logs, where $n_{logs}$ is the number of well logs. As a specific example, if there are ten total well logs, the computing device 112 can generate $(10*(10-1))/2=45$ distinct well-log pairs.

In block 604, the computing device 112 performs dynamic time warping on each well-log pair to determine a respective correlation between each well-log pair. Dynamic time warping can be a technique for determining an alignment or correlation between two time-dependent sequences that may vary in speed. A result of the dynamic time warping can include a set of correlated points between the two well logs in the well-log pair. For example, the computing device 112 can use dynamic time warping to determine that points [1, 2, 3, 4, 5] in one well log correlate to points [3, 4, 5, 6, 7, 9] in another well log.

The computing device 112 can use the manual correction from block 510 to perform the dynamic time warping. For example, referring back to FIG. 3, manually updating the location of stratum surface 1 in well log 304 (as shown by the arrow) can result in an updated correlation between stratum surface 1 in well log 304 and stratum surface 1 in well log 306. Manually updating the location of stratum surface 3 in well log 302 can result in an updated correlation between stratum surface 3 in well log 302 and stratum surface 3 in well log 304. The computing device can use the updated correlations resulting from the manual corrections to perform the dynamic time warping.

Figure 8:
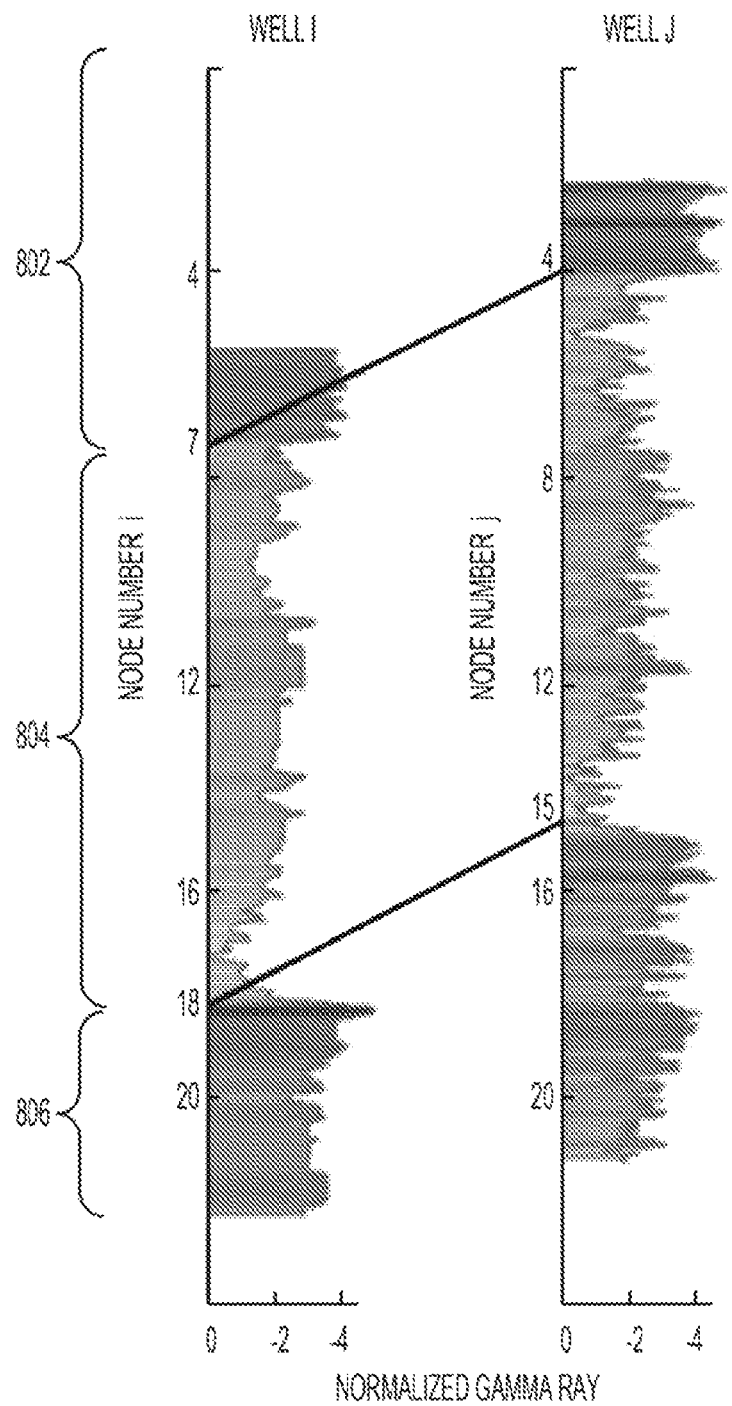
FIG. 8 is a graph of an example of two well logs with nodes correlated to one another according to some aspects.

Another example of manual corrections is shown in FIG. 8. Node number 7 in the well log for Well I is a manually corrected location for stratum surface 1 and is correlated to node number 4 in the well log for Well J. Node number 18 in the well log for Well I is a manually corrected location for stratum surface 3 and is correlated to node number 15 in the well log for Well J. The manual corrections result in updated correlations for stratum surface 1 and stratum surface 3. The computing device 112 can use the updated correlations resulting from the manual corrections to perform the dynamic time warping.

Figure 7:
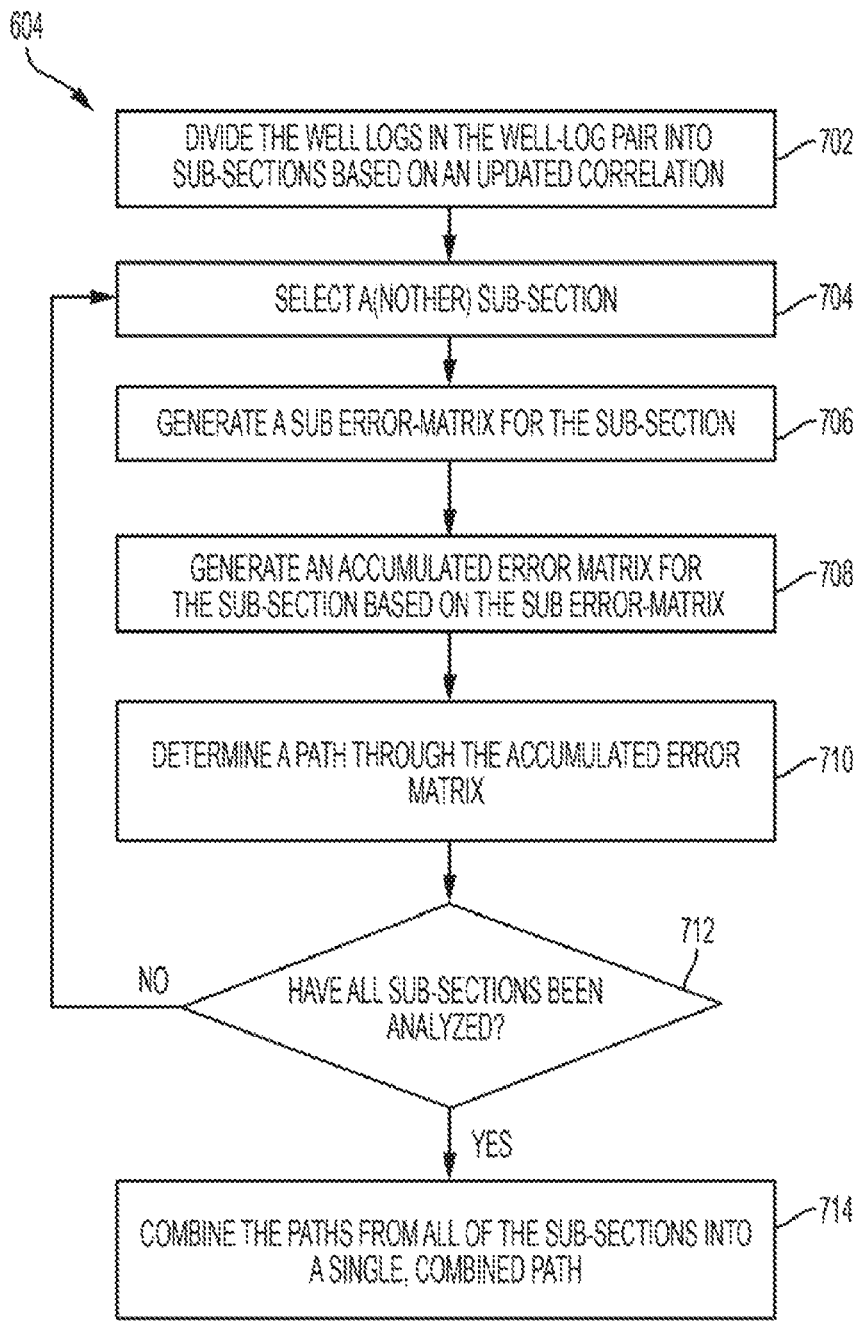
FIG. 7 is a flow chart of an example of a process for performing dynamic time warping according to some aspects.

In some examples, the computing device 112 can perform dynamic time warping on a well-log pair according to the process shown in FIG. 7. In other examples, the computing device 112 can implement a process that has more steps, fewer steps, different steps, or a different order of the steps depicted in FIG. 7.

In block 702, the computing device 112 divides the well logs in the well-log pair into sub-sections based on an updated correlation resulting from a manual correction (e.g., an updated correlation determined in block 604). The number of sub-sections can be equal to the number of updated correlations identified in block 604 plus one. For example, referring to FIG. 8, there are two updated correlations due to the two manual corrections, with the two updated correlations resulting in three sub-sections 802, 804, and 806. The computing device 112 can determine and split the well logs into these three sub-sections 802, 804, and 806. As discussed in greater detail below, the computing device 112 can perform several smaller (and more accurate) correlations using the smaller sub-sections for Well I and Well J, rather than correlating, as a whole, the well logs for Well I and Well J.

In block 704, the computing device 112 selects a sub-section. For example, the computing device 112 can select the first sub-section in a list of sub-sections generated in block 704. In some examples, two or more of the sub-sections can be selected and analyzed in parallel.

Figure 9:
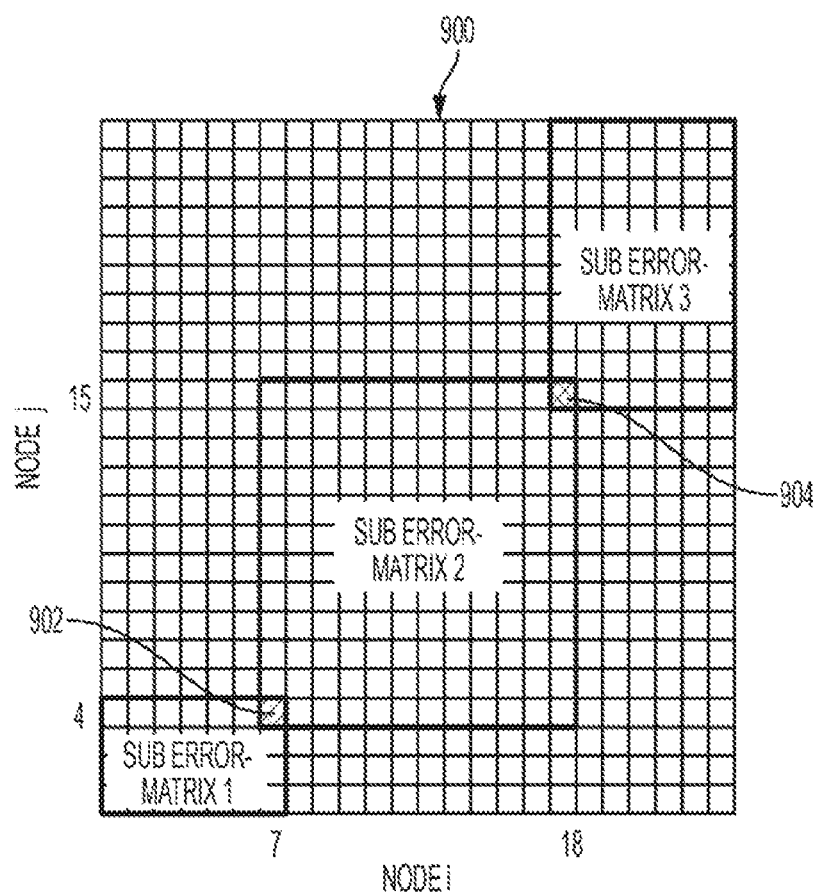
FIG. 9 is a graph of an example of an error matrix according to some aspects.

In block 706, the computing device 112 generates a sub error-matrix for the sub-section. The computing device 112 generates the sub-error matrix from a larger error matrix. An example of sub error-matrices and the larger error matrix 900 is shown in FIG. 9. One axis of the error matrix 900 can represent nodes in one well log (e.g., Well I from FIG. 8) and another axis of the error matrix 900 can represent nodes in another well log (e.g., Well J from FIG. 8). Each box in the error matrix 900 can represent a correlation between a node in one well log and another node in another well log. The computing device 112 can generate the error matrix 900 using the following equation:

$$\text{Error Matrix}(i,j) = \text{Log}_i(i) - \text{Log}_j(j)$$

which can result in an error matrix 900 of size i×j.

Examples of the updated correlations from FIG. 8 are shown in the error matrix 900 of FIG. 9 as points 902 and 904. These updated correlations can serve as constraints that substantially reduce the number of possible paths from the lower-left corner of the error matrix 900 to the upper-right corner of the error matrix 900. For example, the possible paths from the lower-left corner of the error matrix 900 (at point (0,0)) to point 902 are within the area designated as Sub Error-Matrix 1. The possible paths from point 902 to point 904 are within the area designated as Sub Error-Matrix 2. The possible paths from point 904 to the upper-right corner of the error matrix 900 (at point (24, 24)) are within the area designated as Sub Error-Matrix 3. The computing device 112 can perform dynamic time warping using each of these sub error-matrices, which are much smaller than the entire error matrix 900. The dynamic time warping results in a set of (node$_i$, node$_j$) points that can form the minimum average error path from the lower-left corner of the error matrix 900 to the upper-right corner of the error matrix 900 through the manually updated correlation-points 902, 904.

In some examples, a well log can have two or more datasets generated using different methods. For example, a well log can have both Sonic and Gamma Ray data sets. The computing device 112 can generate a combined error-matrix from the two or more data sets. For example, the computing device 112 can generate a first error-matrix for the Sonic data-set and a second error-matrix for the Gamma Ray data-set. The computing device 112 can then average the first error matrix and the second error matrix, or otherwise combine the first error matrix and the second error matrix, to generate a combined error-matrix.

In some examples, averaging error matrices in the manner discussed above may lead to inaccuracies because the sub error-matrices may have different distributions of values. For example, a sub error-matrix generated from a Sonic data-set may have a different distribution of values from another sub error-matrix generated from a Gamma Ray data-set. In some examples, the computing device 112 can overcome this issue by transforming the sub error-matrices from the different data sets into respective uniform distributions prior to combining the sub error-matrices together. The transformed sub error-matrices can then be combined together. For example, the computing device 112 can implement the following equation:

$$\text{CombinedEM}_{i,j} = \text{Uniform}(\text{SEM}_{data\_setA})_{i,j} + \text{Uniform}(\text{SEM}_{data\_setB})_{i,j}$$

where CombinedEM$_{i,j}$ is the combined sub error-matrix; SEM$_{data\_setA}$ is a sub error-matrix generated using one data set (data set A); SEM$_{data\_setB}$ is a sub error-matrix generated using another data set (data set B); and Uniform denotes an operation for transforming a sub-error matrix into a uniform distribution.

In block 708, the computing device 112 generates an accumulated-error matrix for the sub-section based on the sub error-matrix. In some examples, the computing device 112 can generate the accumulated-error matrix according to the process shown in the pseudo code shown in FIG. 10. Referring to FIG. 10, AccE$_{i,j}$ can be a matrix that stores the values of an accumulated error. ErrM$_{i,j}$ can be the previously created sub error-matrix from block 706. PathL$_{i,j}$ can be a matrix that stores the length of the least-mean-error path to every element in the accumulated-error matrix. Dir$_{i,j}$ can be a matrix that stores a record of the last step that was taken to arrive at each element in the path. Storing a record of the last step taken to arrive at each element in the path may simplify a back-tracking process (described in greater detail below) that can follow the creation of the accumulated-error matrix. With reference to the pseudo code in FIG. 10, if the element is a possible final element in the path, the element can be given a value of 0 in Dir$_{i,j}$. If the last step that was taken was from a left element, the direction can be given a value of 1 in Dir$_{i,j}$. If the last step that was taken was from a bottom-left element, the direction can be given a value of 2 in Dir$_{i,j}$. If the last step that was taken was from a bottom element, the direction can be given a value of 3 in Dir$_{i,j}$.

The process shown in pseudo code in FIG. 10 includes a stepping constraint. The stepping constraint necessitates that for every two steps in the horizontal direction, a vertical step must be taken. And, for every two steps in the vertical direction, a horizontal step must be taken. Other examples may not include the stepping constraint or may include a different version of the stepping constraint.

The characteristics of the process shown in FIG. 10 can change depending on the characteristics of the sub-section. For example, the sub-section 802 of FIG. 8 has an undetermined starting node and a known ending node (node number 7). The sub-section 804 has a known starting node (node number 7) and a known ending node (node number 18). The sub-section 806 has a known starting node (node number 18) and an unknown ending node. In some examples, the portion 1002 of the pseudo code in FIG. 10 can be replaced with different pseudo code (and the process performed by the computing device 112 modified accordingly) based on whether the starting node and the ending node of the sub-section are known or unknown. For example, if the sub-section has a known starting node and a known ending node, the portion 1002 can be replaced with the following pseudo code:

```
for (i = 0, j ≠ 0)
    AccE(0, j) = ∞
for(i ≠ 0, j = 0)
    AccE(i, 0) = ∞
for (i = i_max, j ≠ j_max)
    AccE(i_max, j) = ∞
for(i ≠ i_max, j ≠ j_max)
    AccE(i, j_max) = ∞
```

As another example, if the sub-section has a known starting node and an unknown ending node, the portion 1002 can be replaced with the following pseudo code:

```
for (i = 0, j ≠ 0)
    AccE(0, j) = ∞
for(i ≠ 0, j = 0)
    AccE(i, 0) = ∞
```

As another example, if the sub-section has an unknown starting node and a known ending node, the portion 1002 can be replaced with the following pseudo code:

```
for (i = i_max, j ≠ j_max)
    AccE(i_max, j) = ∞
for(i ≠ i_max, j ≠ j_max)
    AccE(i, j_max) = ∞
```

As another example, if the sub-section has an unknown starting node and an unknown ending node, the portion of 1002 may stay the same.

In block 710, the computing device 112 determines a path through the accumulated-error matrix. The path can result in the smallest overall error in a correlation between the well logs for the sub-section. For example, a starting point for the sub-section may be known but an ending point for the sub-section may be unknown. In such an example, the computing device 112 can determine the path at least in part by determining an ending point for the sub-section. For example, each point (e.g., each ($node_i$, $node_j$) coordinate) in the accumulated-error matrix can include the average error for arriving at that point. The computing device 112 can analyze the points along an upper-most row and right-most column in the accumulated-error matrix to determine which point has the lowest average error. The computing device 112 can use that point as the ending point. With the starting and the ending points both now known, the computing device 112 can determine a path between the two points using a process called backtracking.

Backtracking includes determining a path between a starting point and an ending point in the accumulated-error matrix using the Dir matrix described above with reference to FIG. 10. The Dir matrix can contain the direction to a previous point. The computing device 112 can back track the path between the starting point and the ending point by starting at the ending point, finding the previous point, and adding it to a list. The computing device 112 can then step backwards from the previous point, finding yet another previous point and adding that previous point to the list. The computing device 112 can repeat this process until the path arrives at the starting point. An example of such a process is shown using following pseudo code:

```
CurrentNodes(x, y) = (terminalI, terminalJ)
While 3 > 2
{
    if Dir(x, y) == 1
        add the following node to the path (x − 1, y − 2)
        CurrentNodes(x, y) = (x − 1, y − 2)
    if Dir(x, y) == 2
        add the following node to the path (x − 1, y − 1)
        CurrentNodes(x, y) = (x − 1, y − 1)
    if Dir(x, y) == 3
        add the following node to the path (x − 2, y − 1)
        CurrentNodes(x, y) = (x − 2, y − 1)
    if Dir(x, y) == 0
        Stop. You have reached one of the possible starting points for
        the path.
}
```

In block 712, the computing device 112 determines if all the sub-sections have been analyzed. If the computing device 112 determines that all of the sub-sections have not been analyzed, the process can return to block 704 and select another sub-section to analyze. If the computing device 112 determines that all of the sub-sections have been analyzed, the process can proceed to block 714.

Figure 11A:
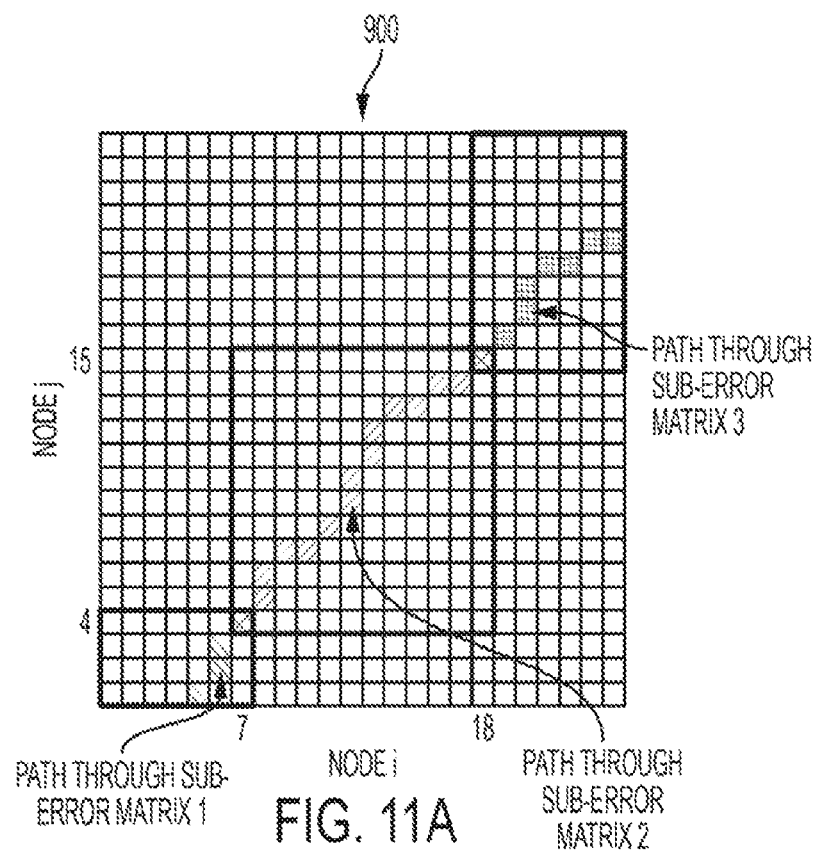
FIG. 11A is a graph of an example of sub-paths through each of the sub-error matrices of FIG. 9 according to some aspects.
Figure 11B:
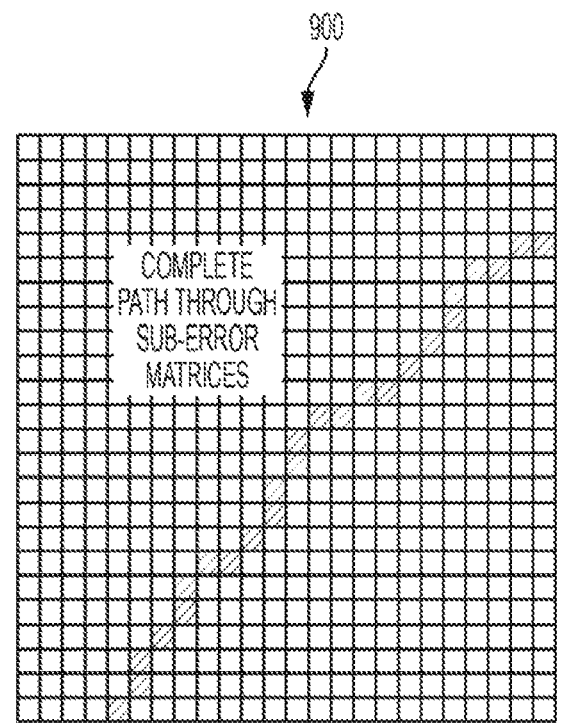
FIG. 11B is a graph of an example of a completed path through the error matrix of FIG. 9 according to some aspects.

In block 714, the computing device 112 combines the paths (e.g., determined in block 710) from all of the sub-sections into a single, combined path. The combined path can be a set of correlated nodes between the well logs in the well-log pair. In some examples, the computing device 112 can concatenate together all of the paths determined for all of the sub-sections into a combined path. For example, FIG. 11A shows an example of sub-paths through each of the sub-error matrices of FIG. 9. FIG. 11B shows an example of a completed path through the error matrix 900 and formed by combining the sub-paths through the sub-error matrices.

The process of FIG. 7 can be repeated for every well-log pair. For example, the computing device 112 can repeat the process of FIG. 7 to determine a combined path between every well-log pair identified in block 602 of FIG. 6. In some examples, after the process of FIG. 7 is complete, the process of FIG. 6 can continue to block 606.

In block 606, the computing device 112 transforms the multiple well logs into flat space based on the respective correlation between each well-log pair (e.g., using the combined path for each well-log pair determined in block 714). Flat space can be a coordinate system in which all the nodes that correspond to the same stratum-surface are positioned in the same two-dimensional plane (e.g., have the same depth). In some examples, the computing device 112 can use the respective correlations between each well-log pair to form a system of equations representing the shifts of the well logs into flat space.

For example, the computing device 112 can determine that node i in Well I is correlated to node j in Well J. The computing device 112 can transform the values for node i and node j into flat space, in which both nodes will have the same depth-value. To transform the values for node i and node j into flat space, a shift can be determined that is equal to the difference in the depth values between node i and node j. This shift can be represented by the following shift equation:

$$\text{shift}(i, \text{Well}_I) - \text{shift}(j, \text{Well}_J) = z_j - z_i$$

where $z_j$ is a depth value for node j and $z_i$ is a depth value for node i. The computing device 112 can repeat this process for every ($node_i$, $node_j$) correlation in every well-log pair to form a system of equations. The system of equations can form a matrix, which can be represented as:

$$D_s s \approx d_s$$

where $D_s$ can be a sparse matrix operator having ones and negative ones usable to determine the difference between the shifts in the above equation; s can be a column having the shifts of every node of every well log into flat space; and $d_s$ can be a column expressing the difference in depth for correlated nodes (e.g., ($z_j-z_i$)).

In some examples, some of the rows in the above matrix will correspond to the correlations resulting from the manual corrections and other rows in the matrix will correspond to automatically-determined correlations. The rows in the matrix corresponding to the manual corrections can be weighted (e.g., multiplied by a weighting constant) to give them more weight than the automatically determined correlations.

In some examples, there may be more pairs of correlated nodes than there are total nodes in all the well logs (e.g., because each individual node can be correlated to multiple other nodes). This can result in the above matrix being overdetermined. So, the shifts can be determined by minimizing the squared error of the matrix according to the following equation:

$$\min \|D_s s - d_s\|^2$$

Figure 12A:
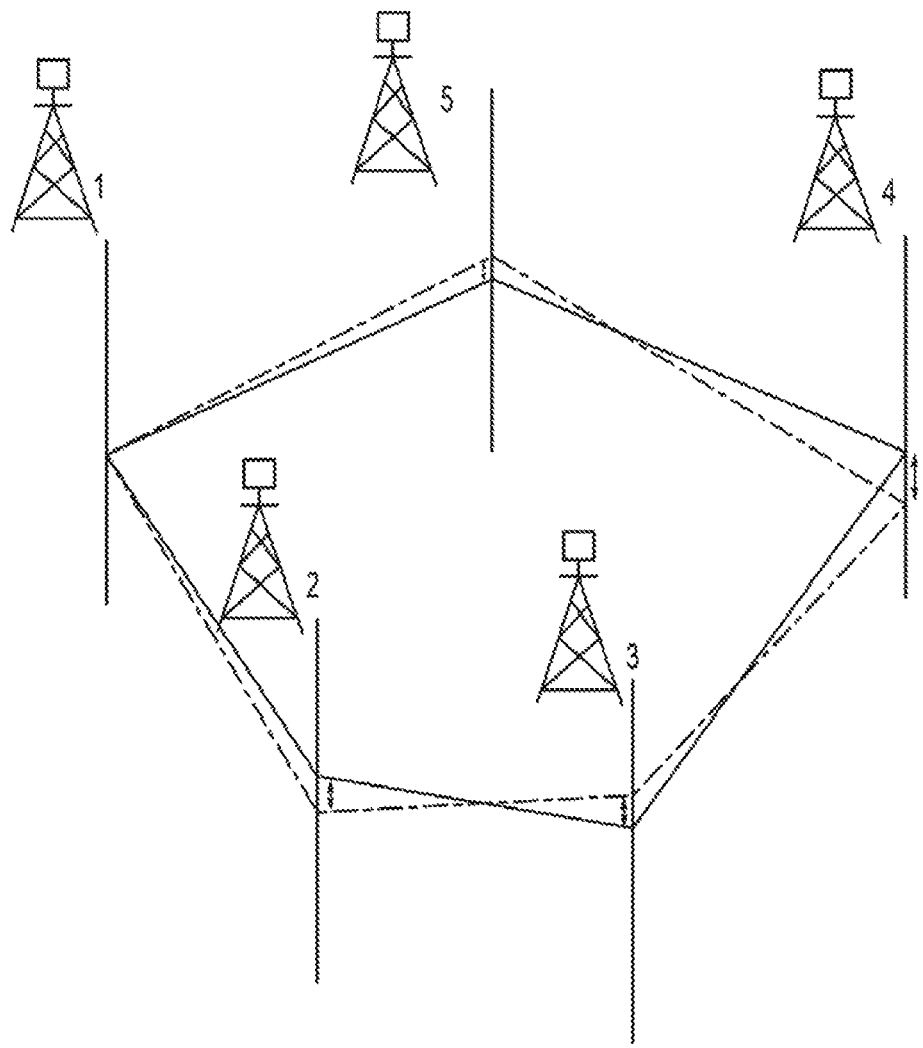
FIG. 12A is a perspective view of an example of a stratum surface generated using least squares optimization according to some aspects.
Figure 12B:
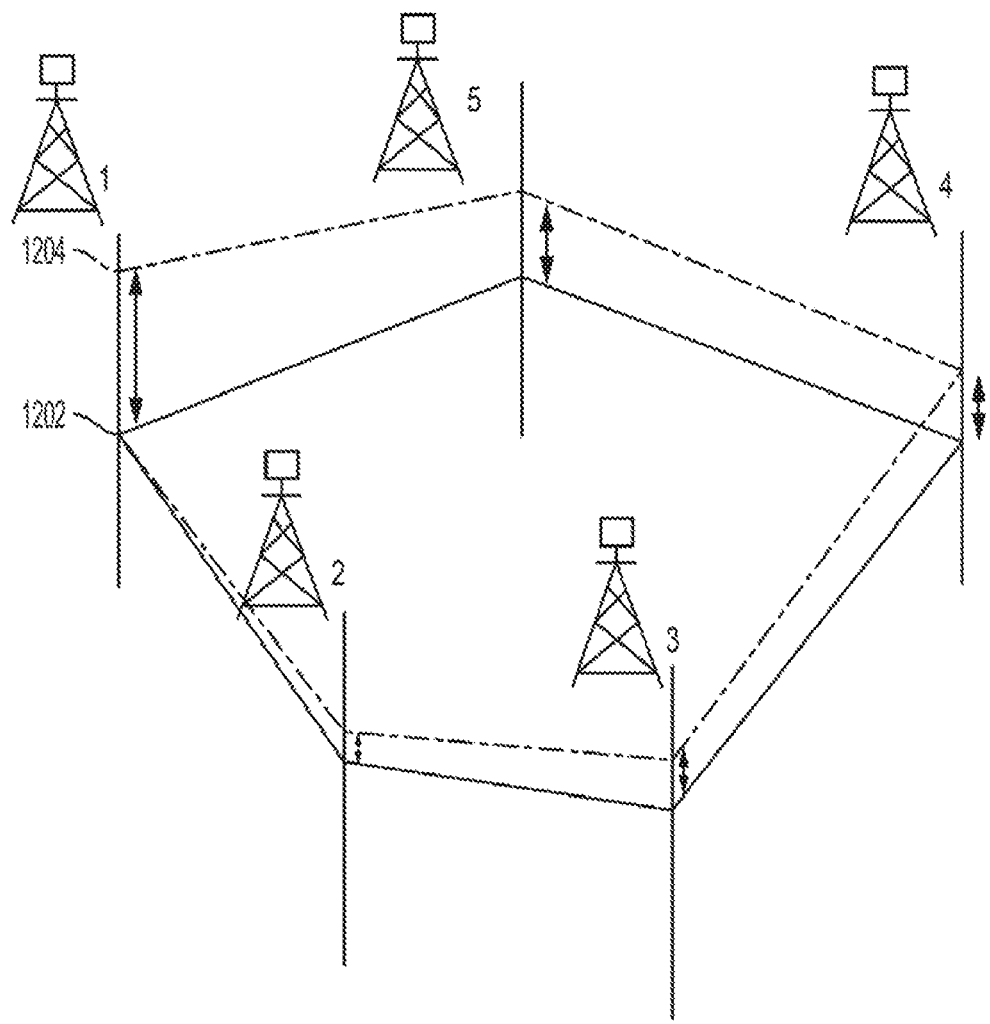
FIG. 12B is a perspective view of an example of a stratum surface generating by propagating well-log correlations according to some aspects.

This can be referred to as least squares optimization. By performing the least squares optimization, error in a calculated stratum surface can be spread across all of the well logs. This can result in a more accurate approximation of the stratum surface than other approaches, which can propagate the error from well-log to well-log. For example, FIG. 12A shows a stratum surface (the dashed line) that was determined using least squares optimization. FIG. 12A also shows the actual stratum surface (the solid line). The stratum surface determined using the least squares optimization is close to the actual stratum surface, and the error between the two surfaces is evenly distributed among wells 1-5. Conversely, FIG. 12B shows a stratum surface (the dashed line) determined by propagating errors from well log to well log. An example of propagating errors from well log to well log can include propagating the error from a starting point 1202 of a stratum surface in well 1 to well 2, and well 2 to well 3, and well 3 to well 4, and so on. As shown in FIG. 12B, the amount of error continues to increase, resulting in the ending point 1204 for the stratum surface failing to connect to the original starting point 1202.

After determining the shifts to flat space, the computing device 112 can use the shifts to transform the well logs into flat space.

In block 608, the computing device 112 transforms nodes having the same depth-value in flat space into a depth domain to determine the updated versions of the one or more stratum surfaces. For example, once all of the well logs are transformed into flat space, the computing device 112 can identify all of the nodes that have the same depth-value in flat space. The computing device 112 can then transform those nodes into the depth domain, where they represent the updated versions of the one or more stratum surfaces.

In block 610, the computing device 112 displays the updated stratum surface. For example, the computing device 112 can display a GUI that includes some or all of the well logs and a line (e.g., a solid or dashed line) indicating the updated stratum surface. An example of such a GUI was previously described with respect to FIG. 4.

Figure 13:
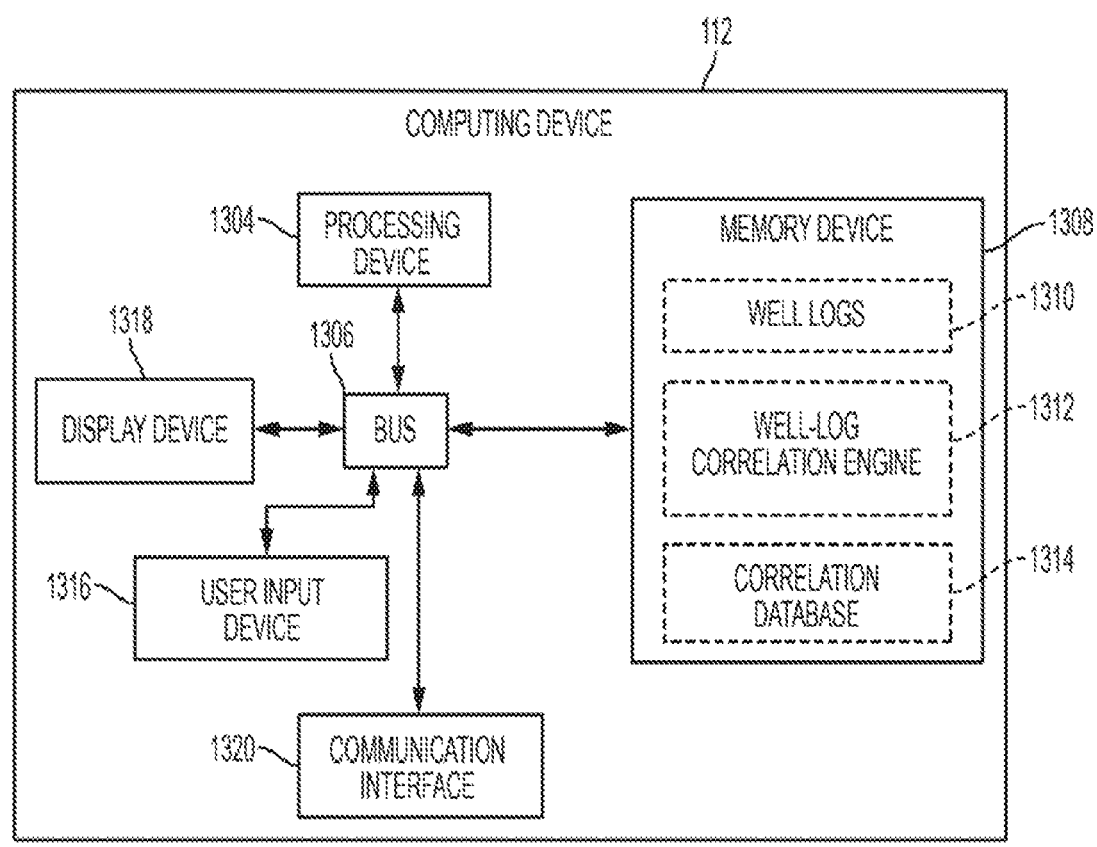
FIG. 13 is a block diagram of an example of a computing device according to some aspects.

In some examples, some or all of the abovementioned features can be implemented using the computing device 112 shown in FIG. 13. The computing device 112 can include a processing device 1304, a bus 1306, a memory device 1308, a user input device 1316, a display device 1318, and a communication interface 1320. In some examples, some or all of the components shown in FIG. 13 can be integrated into a single structure, such as a single housing. In other examples, some or all of the components shown in FIG. 13 can be distributed (e.g., in separate housings) and in electrical communication with each other.

The processing device 1304 can execute one or more operations for automatically correlating strata surfaces across well logs. The processing device 1304 can execute instructions stored in the memory device 1308 to perform the operations. The processing device 1304 can include one processing device or multiple processing devices. Non-limiting examples of the processing device 1304 include a Field-Programmable Gate Array ("FPGA"), an application-specific integrated circuit ("ASIC"), a microprocessing device, etc.

The processing device 1304 can be communicatively coupled to the memory device 1308 via the bus 1306. The non-volatile memory device 1308 may include any type of memory device that retains stored information when powered off. Non-limiting examples of the memory device 1308 include electrically erasable and programmable read-only memory ("EEPROM"), flash memory, or any other type of non-volatile memory. In some examples, at least some of the memory device 1308 can include a medium from which the processing device 1304 can read instructions. A computer-readable medium can include electronic, optical, magnetic, or other storage devices capable of providing the processing device 1304 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C #, etc.

In some examples, the memory device 1308 can include well logs 1310. The well logs 1310 can be communicated to the computing device 112 from one or more well tools positioned in one or more wellbores.

In some examples, the memory device 1308 can include a well-log correlation engine 1312. The well-log correlation engine 1312 can be a software application for identifying strata surfaces in the well logs 1310 and correlating the strata surfaces among the well logs 1310. More specifically, in some examples, the well-log correlation engine 1312 can correlate nodes in the well logs 1310 to form a multiple stratum-surface correlations. The well-log correlation engine 1312 can then receive user input indicating a correction to a particular stratum-surface correlation of the multiple stratum-surface correlations. The well-log correlation engine 1312 can update some or all of the remaining stratum-surface correlations based on the user input.

In some examples, the memory device 1308 can include a correlation database 1314. The correlation database 1314 can be a database having stratum-surface correlations. For example, the correlation database 1314 can include an association of nodes in the well logs 1310 that belong to a particular stratum surface.

In some examples, the computing device 112 includes a user input device 1316. The user input device 1316 can represent one or more components used to input data. Examples of the user input device 1316 can include a keyboard, mouse, touchpad, button, or touch-screen display, etc.

In some examples, the computing device 112 includes a display device 1318. The display device 1318 can represent one or more components used to output data. Examples of the display device 1318 can include a liquid-crystal display (LCD), a television, a computer monitor, a touch-screen display, etc. In some examples, the user input device 1316 and the display device 1318 can be a single device, such as a touch-screen display.

In some examples, the computing device 112 includes a communication interface 1320. The communication interface 1320 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some aspects, strata surfaces can be correlated across well logs according to one or more of the following examples:

Example #1: A method can include receiving, by a processing device, a plurality of well logs. Each well log of the plurality of well logs can indicate subterranean strata penetrated by a respective wellbore associated with the well log. The method can include correlating, by the processing device, data points in the plurality of well logs to form a plurality of stratum-surface correlations. Each stratum-surface correlation can be a respective association between the data points that correspond to a respective surface of a respective stratum of the subterranean strata. The method can include receiving, by the processing device, user input indicating a correction to a particular stratum-surface correlation of the plurality of stratum-surface correlations. The method can include updating, by the processing device and based on the user input, other stratum-surface correlations that are different from the particular stratum-surface correlation in the plurality of stratum-surface correlations.

Example #2: The method of Example #1 may include updating the other stratum-surface correlations by combining all of the well logs in the plurality of well logs into a plurality of well-log pairs. Each well-log pair in the plurality of well-log pairs can include two well logs from among the plurality of well logs. A well-log pair can then be selected from the plurality of well-log pairs. A correlation between a first well-log and a second well-log in the well-log pair can be determined by performing dynamic time warping. The other stratum-surface correlations can be updated based at least in part on the correlation between the first-well log and the second well-log in the well-log pair.

Example #3: The method of Example #2 may include determining the correlation between the first well-log and the second well-log in the well-log pair by dividing the well-log pair into a plurality of sub-sections based on the user input. A plurality of paths through a plurality of accumulated-error matrices associated with the plurality of sub-sections can be generated. Each path of the plurality of paths can correspond to a respective accumulated-error matrix and a respective sub-section. The plurality of paths can be combined into a single path.

Example #4: The method of Example #3 may include generating the plurality of paths through the plurality of accumulated error matrices by, for each respective subsection of the plurality of sub-sections, generating a respective sub error-matrix corresponding to the respective subsection based on the user input. The respective sub error-matrix can span from a first point in an error matrix to a second point in the error matrix. At least one of the first point or the second point can be determined based on the user input. A respective accumulated-error matrix for the subsection can be generated based on the respective sub error-matrix. A respective path through the respective accumulated-error matrix can be determined using a backtracking process.

Example #5: The method of any of Examples #3-4 may include transforming the plurality of well logs into flat space based on the plurality of paths through the plurality of error matrices associated with the plurality of well-log pairs. Flat space can be a coordinate system in which data points associated with a same stratum-surface are in positioned in a two-dimensional plane.

Example #6: The method of any of Examples #1-5 may include displaying a graphical user interface (GUI) visually representing an initial position of a stratum surface corresponding to the particular stratum-surface correlation. The user input can include dragging a component of the GUI from a first location indicating the initial position of the stratum surface to a second location indicating a corrected position for the stratum surface.

Example #7: The method of any of Examples #1-6 may include updating a GUI to visually represent updated versions of the other stratum-surface correlations.

Example #8: A system can include a processing device and a memory device that includes instructions executable by the processing device. The instructions can cause the processing device to receive a plurality of well logs. Each well log of the plurality of well logs can indicate subterranean strata penetrated by a respective wellbore associated with the well log. The instructions can cause the processing device to correlate data points in the plurality of well logs to form a plurality of stratum-surface correlations. Each stratum-surface correlation can be a respective association between the data points that correspond to a respective surface of a respective stratum of the subterranean strata. The instructions can cause the processing device to receive user input indicating a correction to a particular stratum-surface correlation of the plurality of stratum-surface correlations. The instructions can cause the processing device to update, based on the user input, other stratum-surface correlations that are different from the particular stratum-surface correlation in the plurality of stratum-surface correlations.

Example #9: The system of Example #8 may feature the memory device further including instructions executable by the processing device for causing the processing device to update the other stratum-surface correlations by combining all of the well logs in the plurality of well logs into a plurality of well-log pairs. Each well-log pair in the plurality of well-log pairs can include two well logs from among the plurality of well logs. A well-log pair can then be selected from the plurality of well-log pairs. A correlation between a first well-log and a second well-log in the well-log pair can be determined by performing dynamic time warping. The other stratum-surface correlations can be updated based at least in part on the correlation between the first-well log and the second well-log in the well-log pair.

Example #10: The system of Example #9 may feature the memory device further includes including executable by the processing device for causing the processing device to determine the correlation between the first well-log and the second well-log in the well-log pair by dividing the well-log pair into a plurality of sub-sections based on the user input. A plurality of paths through a plurality of accumulated-error matrices associated with the plurality of sub-sections can be generated. Each path of the plurality of paths can correspond to a respective accumulated-error matrix and a respective sub-section. The plurality of paths can be combined into a single path.

Example #11: The system of Example #10 may feature the memory device further including instructions executable by the processing device for causing the processing device to generate the plurality of paths through the plurality of accumulated error matrices by, for each respective subsection of the plurality of sub-sections, generating a respective sub error-matrix corresponding to the respective subsection based on the user input. The respective sub error-matrix can span from a first point in an error matrix to a second point in the error matrix. At least one of the first point or the second point can be determined based on the user input. A respective accumulated-error matrix for the subsection can be generated based on the respective sub error-matrix. A respective path through the respective accumulated-error matrix can be determined using a backtracking process.

Example #12: The system of any of Examples #10-11 may feature the memory device further including instructions executable by the processing device for causing the processing device to transform the plurality of well logs into flat space based on the plurality of paths through the plurality of error matrices associated with the plurality of well-log pairs. Flat space can be a coordinate system in which data points associated with a same stratum-surface are in positioned in a two-dimensional plane.

Example #13: The system of any of Examples #8-12 may feature the memory device further including instructions executable by the processing device for causing the processing device to display a graphical user interface (GUI) visually representing an initial position of a stratum surface corresponding to the particular stratum-surface correlation. The user input can include dragging a component of the GUI from a first location indicating the initial position of the stratum surface to a second location indicating a corrected position for the stratum surface.

Example #14: The system of any of Examples 8-13 may feature the memory device further including instructions executable by the processing device for causing the processing device to update a GUI to visually represent updated versions of the other stratum-surface correlations.

Example #15: A non-transitory computer-readable medium can include instructions executable by a processing device. The instructions can cause the processing device to receive a plurality of well logs. Each well log of the plurality of well logs can indicate subterranean strata penetrated by a respective wellbore associated with the well log. The instructions can cause the processing device to correlate data points in the plurality of well logs to form a plurality of stratum-surface correlations. Each stratum-surface correlation can be a respective association between the data points that correspond to a respective surface of a respective stratum of the subterranean strata. The instructions can cause the processing device to receive user input indicating a correction to a particular stratum-surface correlation of the plurality of stratum-surface correlations. The instructions can cause the processing device to update, based on the user input, other stratum-surface correlations that are different from the particular stratum-surface correlation in the plurality of stratum-surface correlations.

Example #16: The non-transitory computer-readable medium of Example #15 may feature include instructions executable by the processing device for causing the processing device to update the other stratum-surface correlations by combining all of the well logs in the plurality of well logs into a plurality of well-log pairs. Each well-log pair in the plurality of well-log pairs can include two well logs from among the plurality of well logs. A well-log pair can then be selected from the plurality of well-log pairs. A correlation between a first well-log and a second well-log in the well-log pair can be determined by performing dynamic time warping. The other stratum-surface correlations can be updated based at least in part on the correlation between the first-well log and the second well-log in the well-log pair.

Example #17: The non-transitory computer-readable medium of Example #16 may feature include instructions executable by the processing device for causing the processing device to determine the correlation between the first well-log and the second well-log in the well-log pair by dividing the well-log pair into a plurality of sub-sections based on the user input. A plurality of paths through a plurality of accumulated-error matrices associated with the plurality of sub-sections can be generated. Each path of the plurality of paths can correspond to a respective accumulated-error matrix and a respective sub-section. The plurality of paths can be combined into a single path.

Example #18: The non-transitory computer-readable medium of Example #17 may feature include instructions executable by the processing device for causing the processing device to generate the plurality of paths through the plurality of accumulated error matrices by, for each respective subsection of the plurality of sub-sections, generating a respective sub error-matrix corresponding to the respective subsection based on the user input. The respective sub error-matrix can span from a first point in an error matrix to a second point in the error matrix. At least one of the first point or the second point can be determined based on the user input. A respective accumulated-error matrix for the subsection can be generated based on the respective sub error-matrix. A respective path through the respective accumulated-error matrix can be determined using a backtracking process.

Example #19: The non-transitory computer-readable medium of any of Examples #17-18 may feature include instructions executable by the processing device for causing the processing device to transform the plurality of well logs into flat space based on the plurality of paths through the plurality of error matrices associated with the plurality of well-log pairs. Flat space can be a coordinate system in which data points associated with a same stratum-surface are in positioned in a two-dimensional plane.

Example #20: The non-transitory computer-readable medium of any of Examples #15-19 may feature include instructions executable by the processing device for causing the processing device to display a graphical user interface (GUI) visually representing an initial position of a stratum surface corresponding to the particular stratum-surface correlation. The user input can include dragging a component of the GUI from a first location indicating the initial position of the stratum surface to a second location indicating a corrected position for the stratum surface.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
receiving, by a processing device, a plurality of well logs, each well log of the plurality of well logs indicating subterranean strata penetrated by a respective wellbore associated with the well log;
correlating, by the processing device, data points in the plurality of well logs to form a plurality of stratum-surface correlations, each stratum-surface correlation being a respective association between the data points that correspond to a respective surface of a respective stratum of the subterranean strata;
receiving, by the processing device, user input indicating a correction to a particular stratum-surface correlation of the plurality of stratum-surface correlations; and
updating, by the processing device and based on the user input, other stratum-surface correlations that are different from the particular stratum-surface correlation in the plurality of stratum-surface correlations, wherein updating the other stratum-surface correlations comprises:
selecting a first well-log and a second well-log from the plurality of well logs, wherein the first well-log and the second well-log form a well-log pair among a plurality of well-log pairs;
determining a correlation between the first well-log and the second well-log, wherein determining the correlation comprises:
dividing the well-log pair into a plurality of sub-sections based on the user input; and
generating a plurality of paths through a plurality of accumulated error matrices associated with the plurality of sub-sections; and
combining the plurality of paths into a single path; and
updating the other stratum-surface correlations based at least in part on the correlation between the first well-log and the second well-log in the well-log pair.

2. The method of claim 1, wherein determining the correlation between the first well-log and the second well-log in the well-log pair comprises performing dynamic time warping.

3. The method of claim 1, wherein each path of the plurality of paths corresponds to a respective accumulated-error matrix and a respective sub-section.

4. The method of claim 3, wherein generating the plurality of paths through the plurality of accumulated error matrices comprises, for each respective subsection of the plurality of sub-sections:
generating a respective sub error-matrix corresponding to the respective subsection based on the user input, the respective sub error-matrix spanning from a first point in an error matrix to a second point in the error matrix, wherein at least one of the first point or the second point is determined based on the user input;
generating a respective accumulated-error matrix for the subsection based on the respective sub error-matrix; and
determining a respective path through the respective accumulated-error matrix using a backtracking process.

5. The method of claim 3, further comprising transforming the plurality of well logs into flat space based on the plurality of paths through the plurality of accumulated error matrices associated with the plurality of well-log pairs, wherein flat space is a coordinate system in which data points associated with a same stratum-surface are positioned in a two-dimensional plane.

6. The method of claim 1, further comprising displaying a graphical user interface (GUI) visually representing an initial position of a stratum surface corresponding to the particular stratum-surface correlation,
wherein the user input comprises dragging a component of the GUI from a first location indicating the initial position of the stratum surface to a second location indicating a corrected position for the stratum surface.

7. The method of claim 6, further comprising updating the GUI to visually represent updated versions of the other stratum-surface correlations.

8. A system comprising:
a processing device; and
a memory device that includes instructions executable by the processing device for causing the processing device to:
receive a plurality of well logs, each well log of the plurality of well logs indicating subterranean strata penetrated by a respective wellbore associated with the well log;
correlate data points in the plurality of well logs to form a plurality of stratum-surface correlations, each stratum-surface correlation being a respective association between the data points that correspond to a respective surface of a respective stratum of the subterranean strata;
receive user input indicating a correction to a particular stratum-surface correlation of the plurality of stratum-surface correlations; and
update, based on the user input, other stratum-surface correlations that are different from the particular stratum-surface correlation in the plurality of stratum-surface correlations, wherein updating the other stratum-surface correlations comprises:
selecting a first well-log and a second well-log from the plurality of well logs, wherein the first well-log and the second well-log form a well-log pair among a plurality of well-log pairs;
determining a correlation between the first well-log and the second well-log, wherein determining the correlation comprises:
dividing the well-log pair into a plurality of sub-sections based on the user input;
generating a plurality of paths through a plurality of accumulated error matrices associated with the plurality of sub-sections; and
combining the plurality of paths into a single path; and
updating the other stratum-surface correlations based at least in part on the correlation between the first well-log and the second well-log in the well-log pair.

9. The system of claim 8, wherein the memory device further includes instructions executable by the processing device for causing the processing device to determine the correlation between the first well-log and the second well-log in the well-log pair by performing dynamic time warping.

10. The system of claim 8, wherein each path of the plurality of paths corresponds to a respective accumulated-error matrix and a respective sub-section.

11. The system of claim 10, wherein the memory device further includes instructions executable by the processing device for causing the processing device to generate the plurality of paths through the plurality of accumulated error matrices by, for each respective subsection of the plurality of sub-sections:
  generating a respective sub error-matrix corresponding to the respective subsection based on the user input, the respective sub error-matrix spanning from a first point in an error matrix to a second point in the error matrix, wherein at least one of the first point or the second point is determined based on the user input;
  generating a respective accumulated-error matrix for the subsection based on the respective sub error-matrix; and
  determining a respective path through the respective accumulated-error matrix using a backtracking process.

12. The system of claim 10, wherein the memory device further includes instructions executable by the processing device for causing the processing device to transform the plurality of well logs into flat space based on the plurality of paths through the plurality of accumulated error matrices associated with the plurality of well-log pairs, wherein flat space is a coordinate system in which data points associated with a same stratum-surface are positioned in a two-dimensional plane.

13. The system of claim 8, wherein the memory device further includes instructions executable by the processing device for causing the processing device to cause a display device to display a graphical user interface (GUI) visually representing an initial position of a stratum surface corresponding to the particular stratum-surface correlation,
  wherein the user input comprises dragging a component of the GUI from a first location indicating the initial position of the stratum surface to a second location indicating a corrected position for the stratum surface.

14. The system of claim 13, wherein the memory device further includes instructions executable by the processing device for causing the processing device to update the GUI to visually represent updated versions of the other stratum-surface correlations.

15. A non-transitory computer-readable medium that includes instructions executable by a processing device for causing the processing device to:
  receive a plurality of well logs, each well log of the plurality of well logs indicating subterranean strata penetrated by a respective wellbore associated with the well log;
  correlate data points in the plurality of well logs to form a plurality of stratum-surface correlations, each stratum-surface correlation being a respective association between the data points that correspond to a respective surface of a respective stratum of the subterranean strata;
  receive user input indicating a correction to a particular stratum-surface correlation of the plurality of stratum-surface correlations; and
  update, based on the user input, other stratum-surface correlations that are different from the particular stratum-surface correlation in the plurality of stratum-surface correlations, wherein updating the other stratum-surface correlations comprises:
    selecting a first well-log and a second well-log from the plurality of well logs, wherein the first well-log and the second well-log form a well-log pair among a plurality of well-log pairs;
    determining a correlation between the first well-log and the second well-log, wherein determining the correlation comprises:
      dividing the well-log pair into a plurality of sub-sections based on the user input;
      generating a plurality of paths through a plurality of accumulated error matrices associated with the plurality of sub-sections; and
      combining the plurality of paths into a single path; and
    updating the other stratum-surface correlations based at least in part on the correlation between the first well-log and the second well-log in the well-log pair.

16. The non-transitory computer-readable medium of claim 15, further comprising instructions executable by the processing device for causing the processing device to:
  combine all of the well logs in the plurality of well logs into the plurality of well-log pairs, each well-log pair in the plurality of well-log pairs including two well logs from among the plurality of well logs; and
  determine the correlation between the first well-log and the second well-log in the well-log pair by performing dynamic time warping.

17. The non-transitory computer-readable medium of claim 15,
  wherein each path of the plurality of paths corresponds to a respective accumulated-error matrix and a respective sub-section.

18. The non-transitory computer-readable medium of claim 17, further comprising instructions executable by the processing device for causing the processing device to generate the plurality of paths through the plurality of accumulated error matrices by, for each respective subsection of the plurality of sub-sections:
  generating a respective sub error-matrix corresponding to the respective subsection based on the user input, the respective sub error-matrix spanning from a first point in an error matrix to a second point in the error matrix, wherein at least one of the first point or the second point is determined based on the user input;
  generating a respective accumulated-error matrix for the subsection based on the respective sub error-matrix; and
  determining a respective path through the respective accumulated-error matrix using a backtracking process.

19. The non-transitory computer-readable medium of claim 17, further comprising instructions executable by the processing device for causing the processing device to transform the plurality of well logs into flat space based on the plurality of paths through the plurality of accumulated error matrices associated with the plurality of well-log pairs, wherein flat space is a coordinate system in which data points associated with a same stratum-surface are positioned in a two-dimensional plane.

20. The non-transitory computer-readable medium of claim 15, further comprising instructions executable by the processing device for causing the processing device to cause a display device to display a graphical user interface (GUI) visually representing an initial position of a stratum surface corresponding to the particular stratum-surface correlation,
  wherein the user input comprises dragging a component of the GUI from a first location indicating the initial position of the stratum surface to a second location indicating a corrected position for the stratum surface.

* * * * *